(12) United States Patent
Heistand, II et al.

(10) Patent No.: US 8,120,905 B2
(45) Date of Patent: Feb. 21, 2012

(54) METHOD TO PREVENT ACCESS COVER ACTUATION DURING SHOCK LOAD

(75) Inventors: Raymond D. Heistand, II, Round Rock, TX (US); Brandi Oldt, Austin, TX (US); Richard Daniel Trotta, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 234 days.

(21) Appl. No.: 12/509,080

(22) Filed: Jul. 24, 2009

(65) Prior Publication Data

US 2011/0019361 A1     Jan. 27, 2011

(51) Int. Cl.
*H05K 7/12* (2006.01)

(52) U.S. Cl. .................................. 361/679.58; 292/140

(58) Field of Classification Search ............. 361/679.02, 361/679.33–35, 679.37–39, 732, 724–727, 361/679.58, 752; 292/140, 32, 37, 40, 41, 292/157, 137, 138, 143, DIG. 11
See application file for complete search history.

(56) References Cited

U.S. PATENT DOCUMENTS

| | | | |
|---|---|---|---|
| 3,841,674 A | 10/1974 | Bisbing et al. | |
| 6,398,325 B1 * | 6/2002 | Chen et al. | 312/223.2 |
| 6,935,661 B1 * | 8/2005 | Farnsworth et al. | 292/162 |
| 7,614,672 B2 * | 11/2009 | Smith et al. | 292/336.3 |

* cited by examiner

*Primary Examiner* — Jinhee Lee
*Assistant Examiner* — Ingrid Wright
(74) *Attorney, Agent, or Firm* — Haynes and Boone, LLP

(57) ABSTRACT

A latch apparatus includes a first portion having a first latch member maintained in a latched position by a first and a second resilient member. A second portion includes a second latch member maintained in a latched position by only the second resilient member. The second portion is movable both simultaneously with and independently of the first portion. An actuator is connected to move the first and second portions simultaneously.

20 Claims, 8 Drawing Sheets

METHOD TO PREVENT ACCESS COVER ACTUATION DURING SHOCK LOAD

BACKGROUND

The present disclosure relates generally to information handling systems, and more particularly to a avoiding inadvertent actuation of a chassis cover.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Covers for IHS chassis are preferably relatively easy to remove. Typically a latch device is actuated to release the cover. However, the latch device needs to be ergonomically compatible so that excess force is not required for actuation. On the other hand, the latch must be robust enough to avoid inadvertent actuation during a shock load such as during a drop test or an unplanned drop.

Accordingly, it would be desirable to provide an improved chassis cover latch which avoids inadvertent actuation absent the disadvantages discussed above.

SUMMARY

According to one embodiment, a latch apparatus includes a first portion having a first latch member maintained in a latched position by a first and a second resilient member. A second portion includes a second latch member maintained in a latched position by only the second resilient member. The second portion is movable both simultaneously with and independently of the first portion. An actuator is connected to move the first and second portions and the first and second latch members simultaneously.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
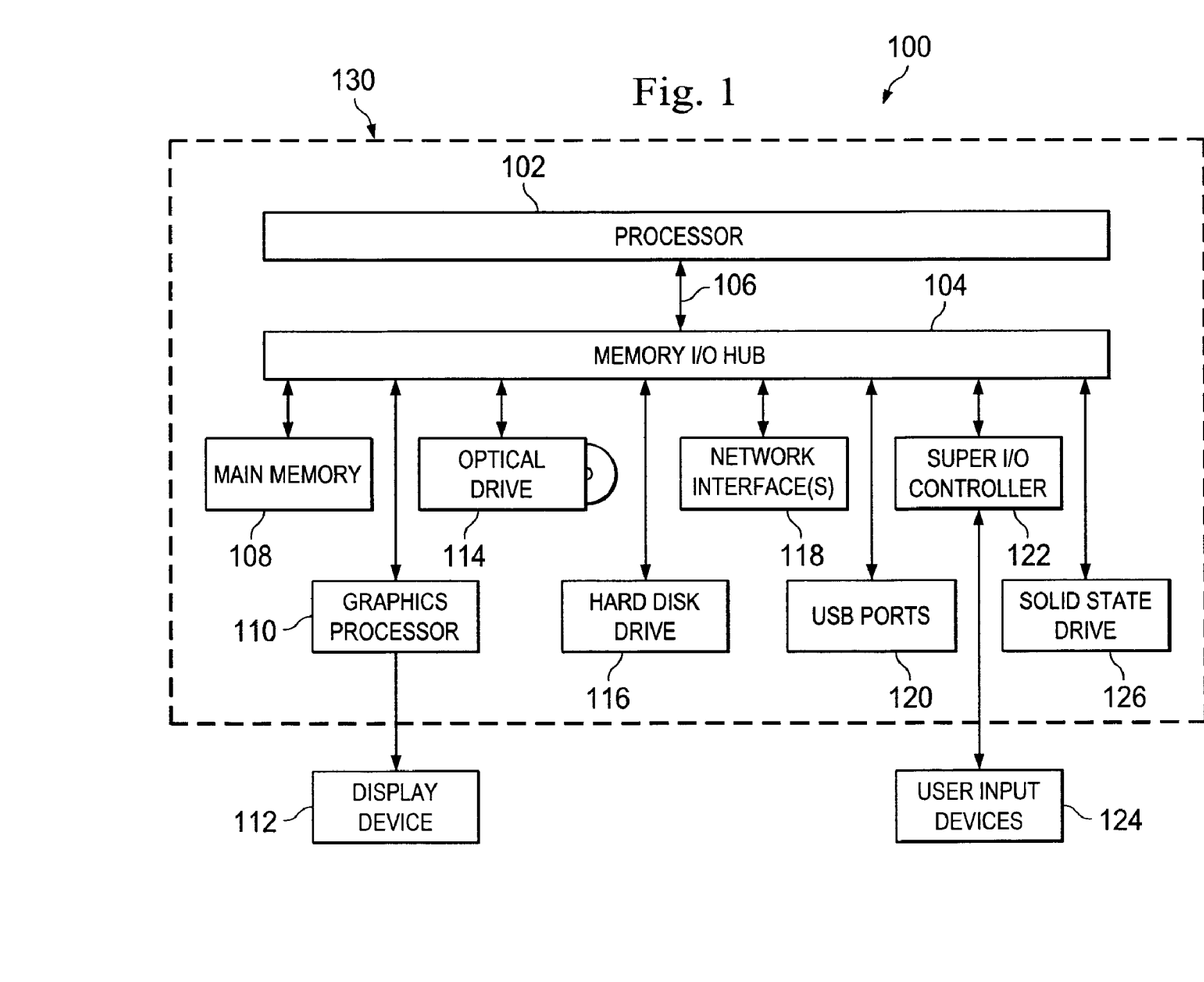
FIG. 1 is a diagrammatic view illustrating an embodiment of an IHS.

FIG. 1 is a block diagram of an IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116 and 126 may be located locally with the IHS 100, located remotely from the IHS 100, and/or they may be virtual with respect to the IHS 100. Portions of the system 100 are provided in an IHS chassis 130, FIG. 1. Other parts of the system 100 such as display 112 and input devices 124, such as a mouse and a keyboard for example are peripherally attached to the system 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

Figure 2:
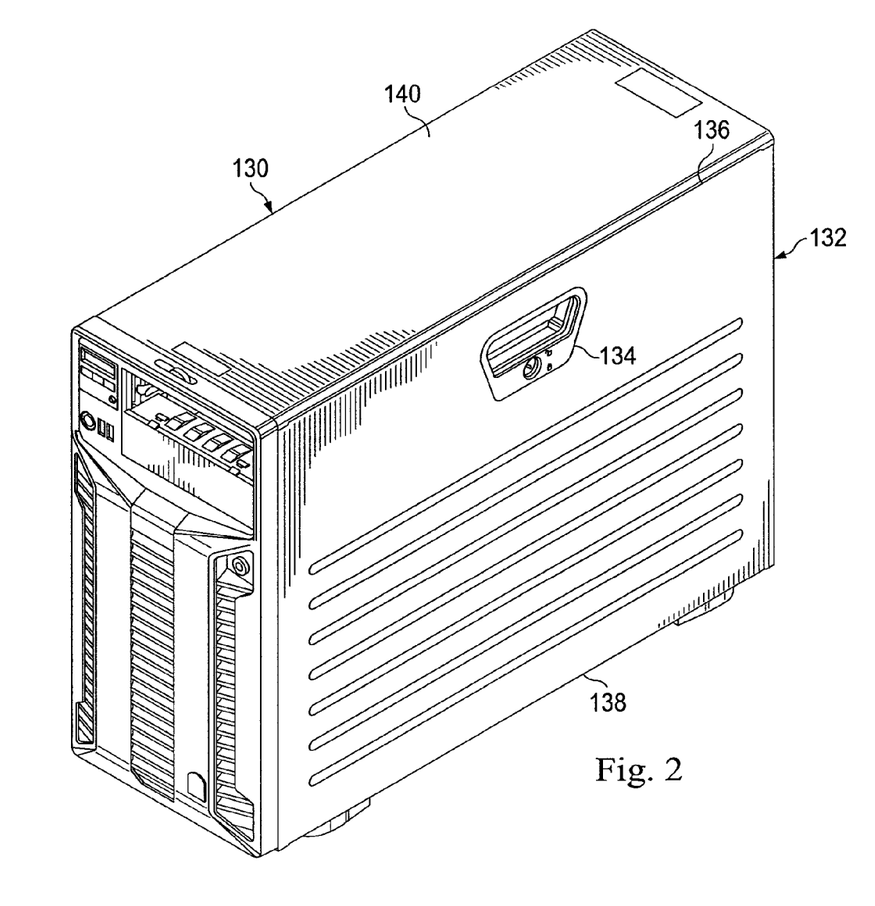
FIG. 2 is a perspective view illustrating an embodiment of an IHS chassis.

In an embodiment, FIG. 2, chassis 130 is provided for housing portions of IHS 100 as set forth above. Chassis 130 includes a removable cover 132 which has a handle 134 assembly adjacent an elongated edge 136 of cover 132. As will be described below, an opposite edge 138 seats in the chassis 130 and cover 132 pivots to a closed position as shown to engage edge 136 with a mating surface 140 of chassis 130 by means of a plurality of latches (discussed below) which can be actuated for disengagement by an actuator 146 adjacent the handle assembly 134.

Figure 3:
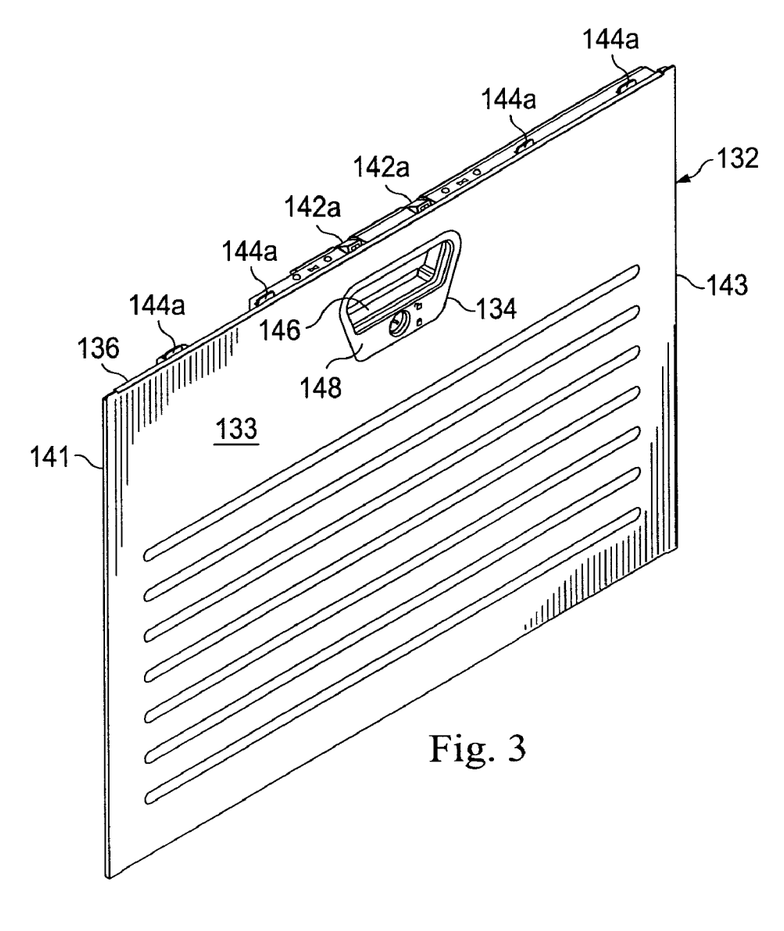
FIG. 3 is a perspective view illustrating an embodiment of an IHS chassis cover external surface.

In FIG. 3, cover 132 is illustrated as detached from chassis 130 thus revealing a first plurality of latches 142a and a second plurality of latches 144a positioned along edge 136 of cover 130. The latches 144a are adjacent opposite ends 141, 143 of cover 132, whereas the latches 142a are positioned between the latches 144a of the second latch member 144 and adjacent the handle assembly 134. The actuator 146 is movable relative to a stationary frame portion 148 of handle assembly 134 on an exterior surface 133 of cover 132 so as to provide user access to handle assembly 134.

Figure 4:
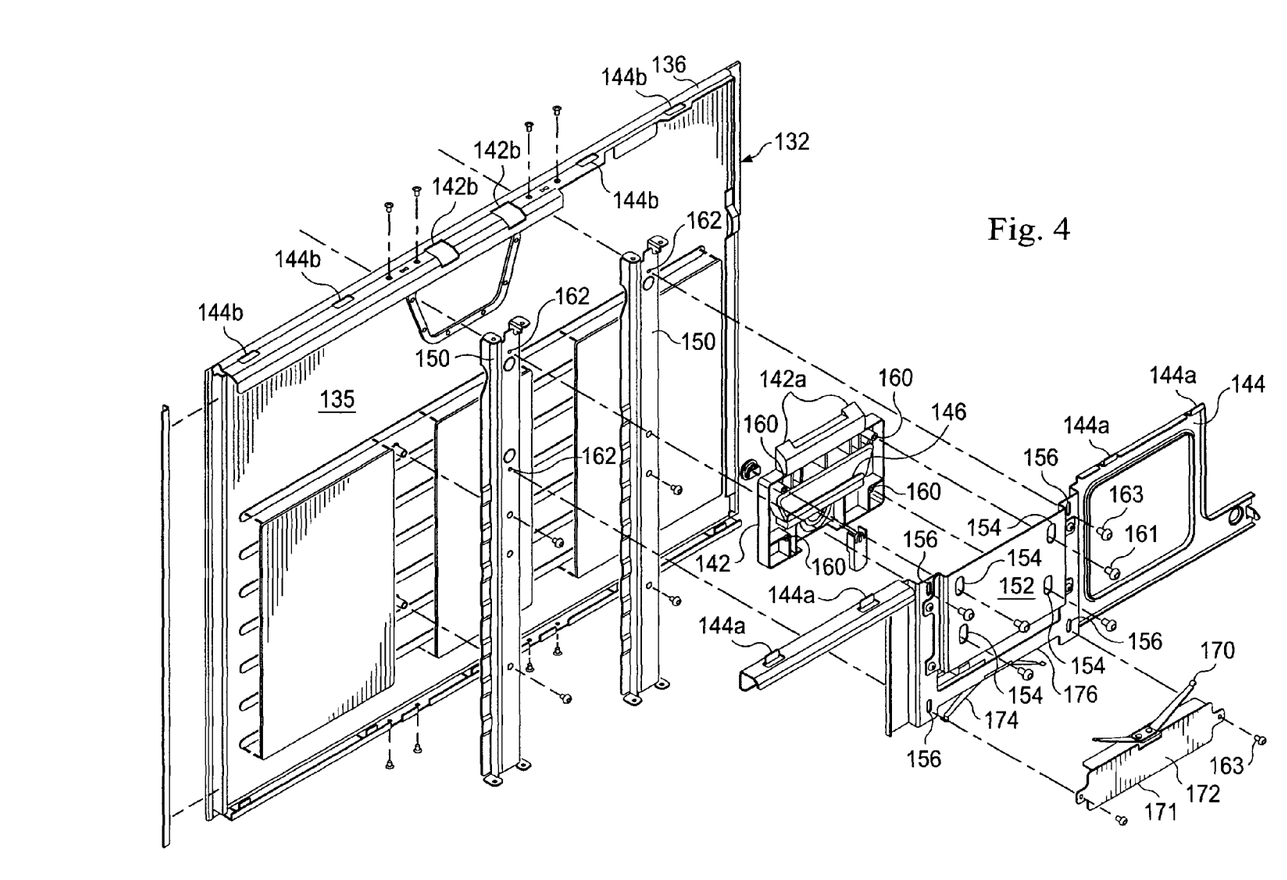
FIG. 4 is an exploded view illustrating an embodiment of the chassis cover internal surface and latch.

In an exploded view of a latch assembly including a first latch member 142 and a second latch member 144, FIG. 4, an interior surface 135 of cover 132 is illustrated including edge 136 having a plurality of openings 142b for guiding movement of latches 142a and a plurality of openings 144b for guiding movement of latches 144a. A pair of frame members 150 are attached to interior surface 135 for attachment of first latch member 142 and second latch member 144.

First latch member 142 is mounted between frame members 150 and is connected to plate 152 of second latch member 144 via a plurality of first slotted apertures 154. Also, second latch member 144 is mounted to slide on frame members 150 via a plurality of second slotted apertures 156. The slotted apertures 154 are movably mounted on fasteners 161 attached to first latch member 142 at fastener anchors 160. The slotted apertures 156 are movably mounted on fasteners 163 attached to second latch member 144 fastener anchors 162, one of which is not visible in FIG. 4.

A first resilient member 170, such as a leaf spring, is mounted on a cross member 172 attached at a pair of the slotted apertures 156. A second resilient member 174 is mounted on a cross member 176 of second latch member 144. When assembled, resilient member 170 engages first latch member 142 and resilient member 174 engages a bottom surface 171 of cross member 172.

Figure 5:
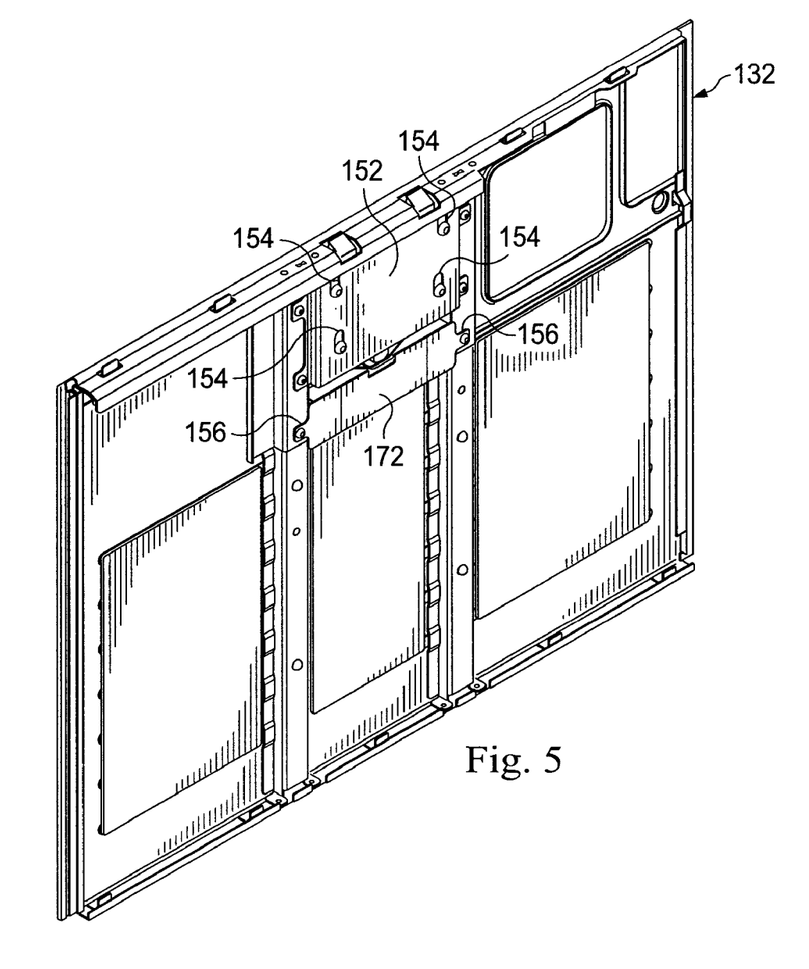
FIG. 5 is a perspective view illustrating an embodiment of the chassis cover internal surface with the latch assembled.

When the parts illustrated in the exploded view of FIG. 4 are assembled, cover 132 appears as illustrated in FIG. 5, including plate member 152 covering first latch member 142 and cross member 172 covering second resilient member 174. The slotted apertures 154 permit independent movement of second latch member 144 relative to first latch member 142, in response to a possible shock load imposed upon chassis 130. This is because, independent movement of second latch member 144 is opposed only by second resilient member 174. The slotted apertures 156 permit simultaneous movement of first latch member 142 and second latch member 144 in response to manual movement of the actuator portion 146 as described above, see also FIG. 3. The simultaneous movement of first latch member 142 and second latch member 144 is simultaneously opposed by first resilient member 170 and second resilient member 174.

Figure 6:
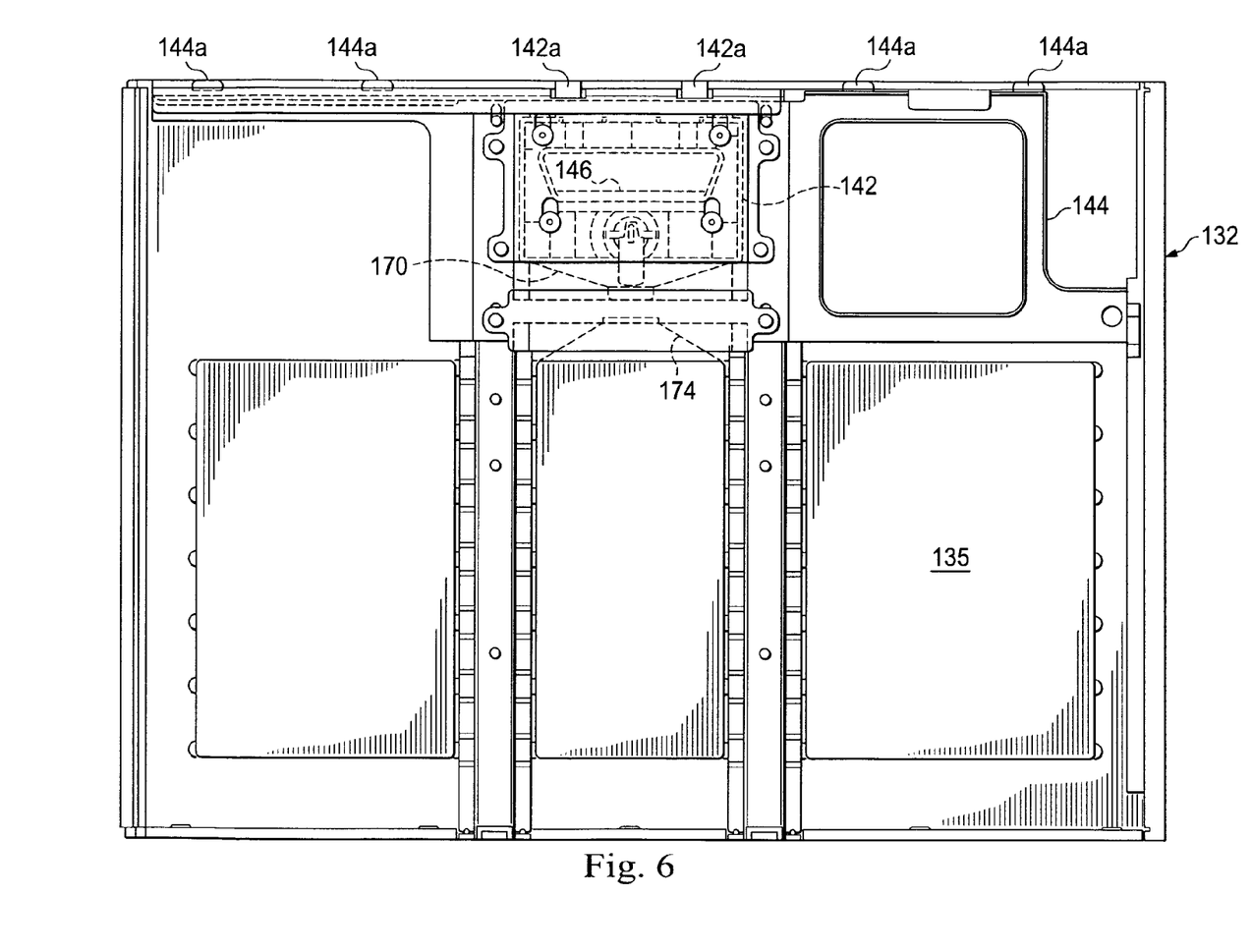
FIGS. 6, 7 and 8 are frontal elevation views illustrating an embodiment of the latch in fully engaged, partially engaged and fully disengaged positions, respectively.
Figure 7:
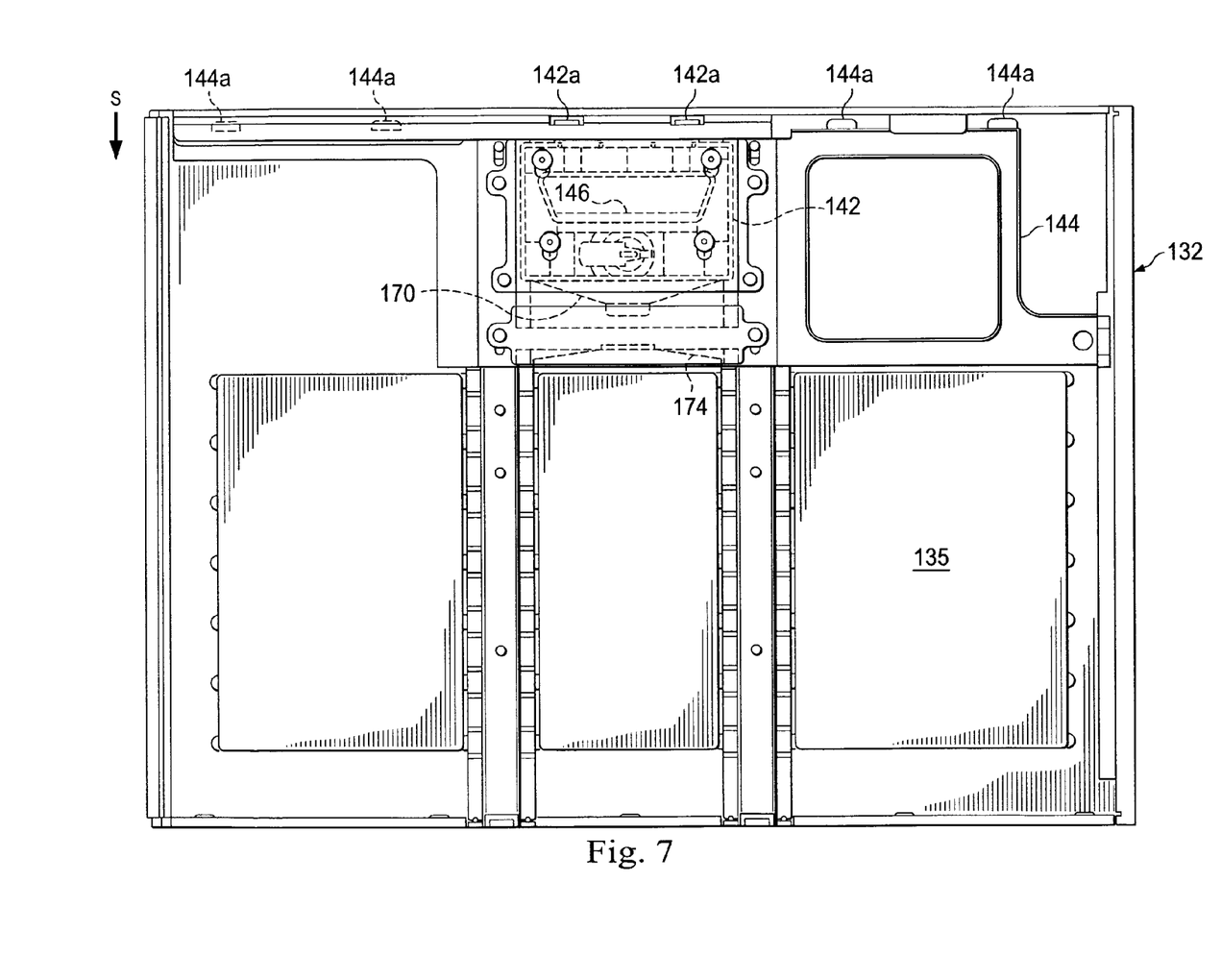
Figure 8:
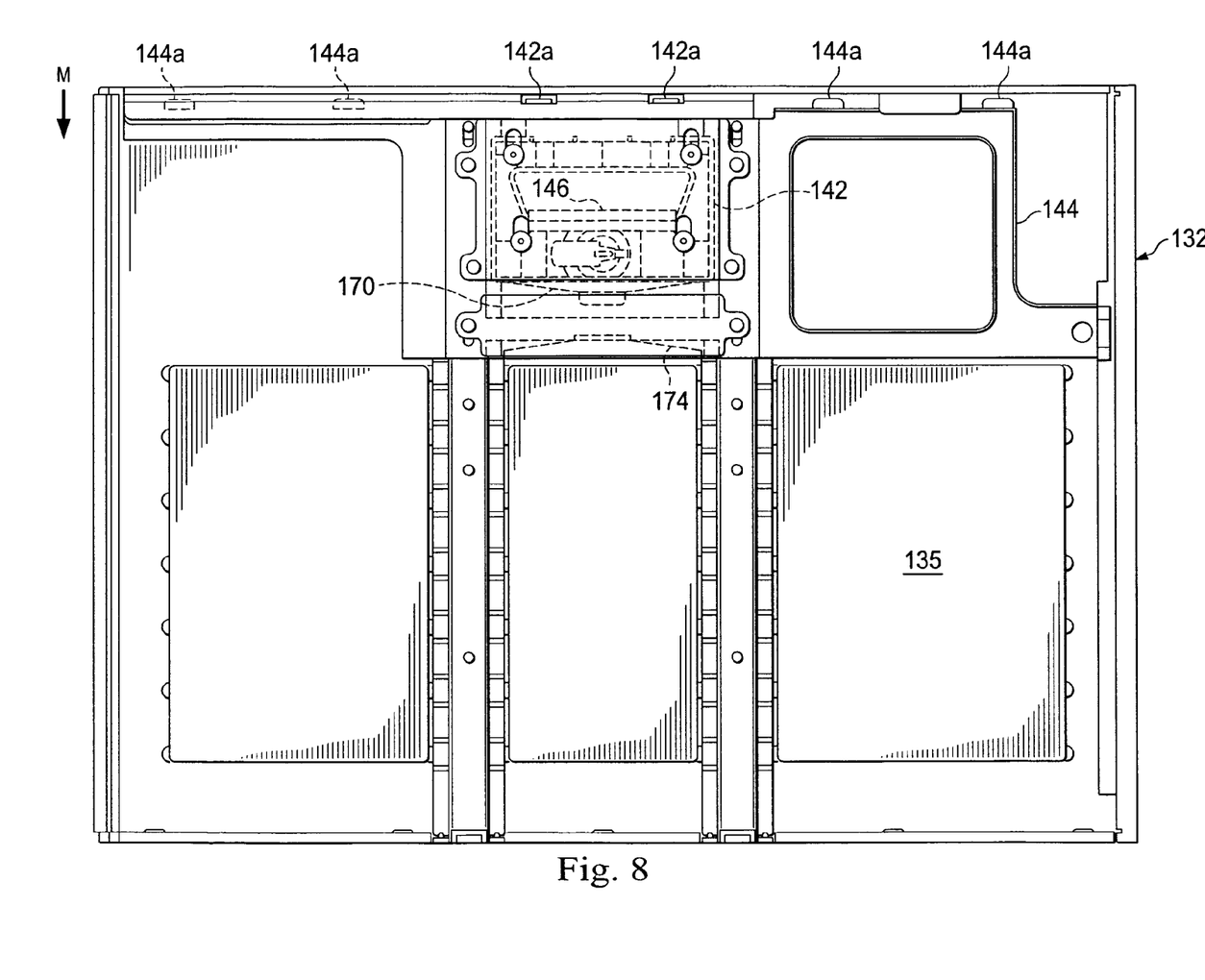

As illustrated in FIGS. 6, 7 and 8, with cover plate 152 and cross member 172 removed, the interior surface 135 of cover 132 is shown with the first resilient member 170 and the second resilient member 174 revealed. Also revealed is the first latch member 142. Second latch member 144 is visible. In FIG. 6, both resilient members 170 and 174 are at rest and first and second latches 142a, 144a, are urged into an engagement position for engaging slots, not shown, in mating surface 140 of chassis 130.

In FIG. 7, due to a sufficient shock load, second latch member 144, resisted only by second resilient member 174, is able to move in a direction indicated by the directional arrow S, sufficiently to retract second latches 144a from engagement whereas first latch member 142 along with first latches 142a remain engaged, thus securing closure of cover 132.

In FIG. 8, due to a manual actuation of actuator portion 146, first latch member 142 and second latch member 144, resisted by resilient members 170 and 174 are urged to move in a direction indicated by the directional arrow M, sufficiently to retract first latches 142a and second latches 144a from engagement, thus permitting cover 132 to be opened and removed.

The new latching embodiments described herein limit unwanted cover actuation but retain a low activation force, a slam closed feature, and an ergonomic interface. The embodiments split the latch mechanism into two semi-independent sections. The first section includes a plastic handle portion for user interaction. The handle portion is spring loaded, and due to its low mass requires a low spring force to remain latched during the shock load. An additional larger and heavier sheet metal latch is required for added strength to support Vacuhoist lifting in the factory. This latch section has a separate spring and does not have to remain latched during a shock load to limit the access cover from opening. When the user depresses the handle, both latch sections unlatch allowing for cover removal. Separating the latches allows for a much lower overall spring force improving the user experience.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A latch apparatus comprising:
   a first latch member that is biased into a latched position by a first resilient member and a second resilient member, wherein the first latch member includes at least one latch that engages a chassis when the first latch member is in the latched position;
   a second latch member that is biased into a latched position by only the second resilient member, wherein the second latch member includes at least one latch that engages the chassis when the second latch member is in the latched position; and
   an actuator coupled to each of the first latch member and second latch members and operable to be actuated to move both the first latch member and the second latch member out of their respective latched positions such that the at least one latch on each of the first latch member and the second latch member are disengaged from the chassis, wherein the second latch member is operable to move independently of the first latch member and out of the latched position, while the first latch member remains in the latched position, in response to a shock event.

2. The apparatus of claim 1 wherein the first and second resilient members are leaf springs.

3. The apparatus of claim 1 wherein the first latch member includes a plurality of latches.

4. The apparatus of claim 1 wherein the second latch member includes a plurality of latches.

5. The apparatus of claim 1 wherein the latch apparatus is mounted on a chassis cover.

6. The apparatus of claim 5 wherein the chassis cover includes an elongated edge having opposite ends.

7. A latch apparatus mounted on a chassis cover and including an edge comprising:

a first portion including a first latch member maintained in a latched position by a first and a second resilient member;

a second portion including a second latch member maintained in a latched position by only the second resilient member, the second portion being movable both simultaneously with and independently of the first portion;

an actuator, connected to move the first and second portions and the first and second latch members simultaneously, of claim 6 wherein the first and second latch members are adjacent the edge, the second latch member including a plurality of latches adjacent the opposite ends and the first latch member being between the latches of the second latch member.

8. An information handling system (IHS) comprising: a chassis; a processor housed in the chassis; and a memory coupled to the processor; wherein the chassis includes a cover having a latch apparatus comprising: a first latch member that is biased into a latched position by a first resilient member and a second resilient member, wherein the first latch member includes at least one latch that engages the chassis when the first latch member is in the latched position; a second latch member that is biased into a latched position by only the second resilient member, wherein the second latch member includes at least one latch that engages the chassis when the second latch member is in the latched position; and an actuator coupled to each of the first latch member and second latch members and operable to be actuated to move both the first latch member and the second latch member out of their respective latched positions such that the at least one latch on each of the first latch member and the second latch member are disengaged from the chassis, wherein the second latch member is operable to move independently of the first latch member and out of the latched position, while the first latch member remains in the latched position, in response to a shock event.

9. The system of claim 8 wherein the first and second resilient members are leaf springs.

10. The system of claim 8 wherein the first latch member includes a plurality of latches.

11. The system of claim 8 wherein the second latch member includes a plurality of latches.

12. The system of claim 8 wherein the latch apparatus is mounted on a chassis cover.

13. The system of claim 12 wherein the chassis cover includes an elongated edge having opposite ends.

14. An information handling system, comprising: a chassis; processor mounted in the chassis; a memory coupled to the processor; the chassis including a cover having an edge with opposite ends and a latch apparatus comprising: a first portion including a first latch member maintained in a latched position by a first and a second resilient member; a second portion including a second latch member maintained in a latched position by only the second resilient member, the second portion being movable both simultaneously with and independently of the first portion; and an actuator, connected to move the first and second portions and the first and second latch members simultaneously, wherein the first and second latch members are adjacent the edge, the second latch member including a plurality of latches adjacent the opposite ends and the first latch member being between the latches of the second latch member.

15. A method for latching to a chassis, comprising:

biasing a first latch member into a latched position using a first resilient member and a second resilient member such that at least one latch on the first latch member engages a chassis;

biasing a second latch member into a latched position using only the second resilient member such that at least one latch on the second latch member engages the chassis actuating an actuator to move both the first latch member and second latch members out of their respective latched positions such that the at least one latch on each of the first latch member and the second latch member are disengaged from the chassis; and moving the second latch member independently of the first latch member and out of the latched position, while the first latch member remains in the latched position, in response to a shock event.

16. The method of claim 15 wherein the first and second resilient members are leaf springs.

17. The method of claim 15 wherein the first latch member includes a plurality of latches.

18. The method of claim 15 wherein the second latch member includes a plurality of latches.

19. The method of claim 15 wherein the latch apparatus is mounted on a chassis cover.

20. A method of providing a latch apparatus on a chassis cover, comprising: maintaining a first portion of a latch apparatus, having a first latch member, in a latched position by a first and a second resilient member;

maintaining a second portion of the latch apparatus, having a second latch member, in a latched position by only the second resilient member, the second portion being movable both simultaneously with and independently of the first portion; and connecting an actuator to move the first and second portions and the first and second latch members simultaneously, wherein the chassis cover includes an elongated edge having opposite ends, and wherein the first and second latch members are adjacent the elongated edge, the second latch member including a plurality of latches adjacent the opposite ends and the first latch member being between the latches of the second latch member.

* * * * *